United States Patent
Papasakellariou et al.

(10) Patent No.: US 8,238,297 B2
(45) Date of Patent: Aug. 7, 2012

(54) METHOD AND SYSTEM FOR DIMENSIONING SCHEDULING ASSIGNMENTS IN A COMMUNICATION SYSTEM

(75) Inventors: Aris Papasakellariou, Houston, TX (US); Joon-Young Cho, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 836 days.

(21) Appl. No.: 12/183,429

(22) Filed: Jul. 31, 2008

(65) Prior Publication Data

US 2009/0034465 A1 Feb. 5, 2009

Related U.S. Application Data

(60) Provisional application No. 60/953,056, filed on Jul. 31, 2007, provisional application No. 60/976,974, filed on Oct. 2, 2007.

(51) Int. Cl.
  *H04J 11/00* (2006.01)
(52) U.S. Cl. .......... 370/329; 370/431; 370/436
(58) Field of Classification Search ........... None
  See application file for complete search history.

(56) References Cited

U.S. PATENT DOCUMENTS

| | | | | |
|---|---|---|---|---|
| 7,751,368 B2 * | 7/2010 | Li et al. | | 370/332 |
| 7,853,205 B2 * | 12/2010 | Papasakellariou | | 455/23 |
| 7,949,307 B2 * | 5/2011 | Ode | | 455/69 |
| 2003/0185193 A1 * | 10/2003 | Choi et al. | | 370/348 |
| 2005/0107036 A1 * | 5/2005 | Song et al. | | 455/23 |
| 2006/0233272 A1 * | 10/2006 | Raghavan et al. | | 375/260 |
| 2006/0251180 A1 * | 11/2006 | Baum et al. | | 375/260 |
| 2007/0047495 A1 * | 3/2007 | Ji et al. | | 370/335 |
| 2007/0097915 A1 * | 5/2007 | Papasakellariou | | 370/329 |
| 2007/0097927 A1 | 5/2007 | Gorokhov et al. | | |
| 2007/0097981 A1 * | 5/2007 | Papasakellariou | | 370/394 |
| 2007/0211668 A1 * | 9/2007 | Agrawal et al. | | 370/335 |
| 2007/0253386 A1 * | 11/2007 | Li et al. | | 370/338 |
| 2008/0002733 A1 * | 1/2008 | Sutskover | | 370/436 |
| 2008/0062914 A1 * | 3/2008 | Olfat | | 370/321 |
| 2008/0285512 A1 * | 11/2008 | Pan et al. | | 370/329 |
| 2009/0022098 A1 * | 1/2009 | Novak et al. | | 370/329 |
| 2009/0028261 A1 * | 1/2009 | Zhang et al. | | 375/261 |
| 2009/0232062 A1 * | 9/2009 | Higuchi et al. | | 370/329 |
| 2010/0014500 A1 * | 1/2010 | Lee et al. | | 370/342 |
| 2010/0182964 A1 * | 7/2010 | Ojala et al. | | 370/329 |

FOREIGN PATENT DOCUMENTS

EP 1 727 296 11/2006

OTHER PUBLICATIONS

Miki, N. et al., "Optimum Adaptive Modulation and Channel Coding Scheme for Frequency Domain Channel-Dependent Scheduling in OFDM Based Evolved UTRA Downlink", Wireless Communications and Networking Conference, Mar. 11-15, 2007.

* cited by examiner

*Primary Examiner* — Robert Scheibel
(74) *Attorney, Agent, or Firm* — The Farrell Law Firm, P.C.

(57) ABSTRACT

A system and method for performing Scheduling Assignments (SAs) for User Equipments (UEs) at a base station of a communication system by accounting for the different operating conditions UEs may experience or for the different data rates or data packet sizes UEs may require. This reduces a total size of SAs by introducing compact SAs, in addition to full SAs. For compact SAs, the range for the resource allocation or for the spectral efficiency of the signal transmission is restricted or some fields that exist in the full SA are eliminated without adversely impacting scheduling flexibility or system throughput. By reducing the total size of SAs through the use of compact SAs, the corresponding control signaling overhead is reduced, which improves system throughput, improves scheduling flexibility, or improves coverage.

19 Claims, 4 Drawing Sheets

ALL UEs USE SAME UL GRANT FORMAT (310)

UE1, UE4, AND UE5 HAVE LOW SINR AND USE THE COMPACT UL GRANT FORMAT (320)

UE2, UE3, AND UE6 HAVE LARGE SINR AND USE THE FULL UL GRANT FORMAT (330)

METHOD AND SYSTEM FOR DIMENSIONING SCHEDULING ASSIGNMENTS IN A COMMUNICATION SYSTEM

PRIORITY

The present Application for patent claims priority to U.S. Provisional Application No. 60/953,056 entitled, "Control Channel Dimensioning for Scheduling Packet Transmissions in SC-FDMA Communication Systems," which was filed on Jul. 31, 2007, and to U.S. Provisional Application No. 60/976,974 entitled, "Control Channel Dimensioning for Scheduling Packet Transmissions in SC-FDMA Communication Systems," which was filed on Oct. 2, 2007, the contents of which are incorporated herein by reference.

BACKGROUND OF THE INVENTION

1. Field of the Invention

The present invention is directed, in general, to wireless communication systems and, more specifically, to the signaling of scheduling assignments for data packet transmissions through a control channel in a communication system.

2. Description of the Art

In particular, the present invention is directed to the design of scheduling assignments for providing the required scheduling flexibility, while avoiding to always use a maximum size, thereby reducing signaling overhead of the corresponding control channel and improving its coverage.

Several types of signals should be supported for proper functionality of a communication system. In addition to data signals, which convey information content of the communication, control signals also need to be transmitted from User Equipments (UEs) to their serving Base Station (BS or Node B) in the UpLink (UL) of the communication system and from the serving Node B to the UEs in the DownLink (DL) of the communication system in order to enable the proper transmission of data signals. A UE, also commonly referred to as a terminal or a Mobile Station (MS), may be fixed or mobile and may be a wireless device, a cellular phone, a personal computer device, a wireless modem card, etc. A Node B is generally a fixed station and may also be called a Base Transceiver System (BTS), an access point, or some other similar terminology.

The present invention considers that the UL Scheduling Assignments (SAs) for data packet transmission from a UE to its serving Node B, and the DL SAs for data packet transmission from the serving Node B to a UE are conveyed from the serving Node B to UEs through the Physical Downlink Control CHannel (PDCCH). The Node B is assumed to transmit data and control signals over a Transmission Time Interval (TTI), which in an exemplary embodiment of the present invention corresponds to a DL sub-frame.

An exemplary structure for the PDCCH transmission in the DL sub-frame is illustrated in FIG. 1. Orthogonal Frequency Division Multiple Access (OFDMA) is considered as the Node B signaling method. The PDCCH 110 is assumed to occupy the first N symbols of the DL sub-frame. For example, N may range from 1 to 3 OFDM symbols. In addition to the PDCCH, the DL sub-frame includes a region where the Node B transmits packets carrying the information data content to scheduled UEs. This region is typically shared among multiple UEs, and the corresponding data channel will be referred to as the physical downlink shared channel (PDSCH) 120. Some OFDM symbols in the DL sub-frame also include sub-carriers where Reference Signals (RSs) 130, also referred to as pilots, are transmitted. RSs enable a UE to obtain a channel estimate and apply coherent demodulation for the PDCCH and PDSCH, to perform various measurements, and to perform other functionalities as known in the art.

An exemplary embodiment of the present invention assumes that each of the UL SAs and each of the DL SAs are separately coded and individually transmitted by the Node B. Therefore, each UE needs to perform multiple decoding operations in the PDCCH region to determine whether it is assigned an UL SA or a DL SA (or both). An exemplary processing chain for the construction of a PDCCH codeword at the serving Node B is illustrated in FIG. 2.

Referring to FIG. 2, the SA bits 210 are appended Cyclic Redundancy Check (CRC) bits 220, as they are known in the art, and are subsequently encoded 230, rate matched to the assigned resources 240, and finally transmitted 250. Typically, the CRC of each SA is scrambled with the identity of the UE it is intended for. In this manner, as it is known in the art, a UE can determine whether one of the separately coded SAs is intended for it.

An exemplary embodiment of the present invention further considers that a UE uses the Single-Carrier Frequency Division Multiple Access (SC-FDMA) method for its signal transmission. In SC-FDMA, the signal transmission is contiguous in the frequency domain. This is beneficial for reducing the UE power consumption, commonly caused by the associated small Cubic Metric (CM).

The scheduling of data packet transmission from a UE may be assisted by a Sounding RS (SRS) transmitted by the UE, which enables a serving Node B obtain an estimate of the channel conditions the signal transmission from the UE experiences. This estimate is an UL Channel Quality Indicator (CQI) and usually corresponds to a Signal-to-Interference and Noise Ratio (SINR) estimate. The UL CQI estimate can guide the Node B to select the appropriate parameters, such as the Modulation and Coding Scheme (MCS), for the signal transmission by the UE, which are then informed to the UE through the UL SA.

As the PDCCH carries no data information, it constitutes overhead that directly impacts the achievable DL system throughput and peak data rates. Reducing this overhead requires the reduction of the size of the PDCCH fields including the UL SAs or DL SAs. However, such reductions should not constrain scheduling flexibility or adversely impact UL or DL system throughput. On the contrary, scheduling flexibility from having a large size of UL SAs or DL SAs may be impacted because the PDCCH is typically constrained to not exceed a certain size, such as for example, three OFDM symbols in the setup illustrated in FIG. 1.

Therefore, reducing the PDCCH overhead by reducing the size of the individual UL SAs or DL SAs is a major factor for achieving efficient design of a communication system and for providing a key differentiating advantage over other communication systems.

Additionally, reducing the size of the individual UL SAs or DL SAs, improves the respective reception reliability and enhances the respective coverage for UEs experiencing poor channel conditions. This is particularly important for the PDCCH, which typically has lower error requirements than the PDSCH, as it cannot benefit from Hybrid Automatic Repeat reQuest (HARQ).

SUMMARY OF THE INVENTION

Accordingly, the present invention has been designed to address at least the problems and/or disadvantages and to provide at least the advantages described below.

One aspect of the present invention is to provide a method and a system for reducing the size of the UL SAs or the DL SAs in order to reduce the respective overhead in the PDCCH of a communication system.

Another aspect of the present invention is to provide a method and a system for reducing the size of UL SAs or the size of DL SAs to improve the DL coverage of a communication system.

A further aspect of the present invention is to provide a method and a system enabling scheduling flexibility for all SAs, in order to avoid losses in system throughput and scheduler restrictions.

In accordance with an aspect of the present invention, a method for reducing a total size of UpLink (UL) scheduling assignments (SAs) and of DownLink (DL) SAs transmitted from a serving base station (Node B) to User Equipments (UEs) in the DL of a communication system is provided. This is accomplished through the introduction of a compact UL SA and a compact DL SA, in addition to the full UL SA and the full DL SA, which includes all options for the signal transmission by a UE or by the Node B, respectively.

Additionally, the present invention enables extending the coverage of compact SAs, due to their smaller size than the size of full SAs, thereby extending the coverage of a communication system.

Additionally, the present invention enables the Node B scheduler to operate with substantial flexibility and reduces scheduling restrictions, which may result from constraining the total size of the Physical Downlink Control CHannel (PDCCH) to not exceed a certain predetermined size.

In accordance with another aspect of the present invention, a method is provided for supporting UL SAs or DL SAs with at least two different sizes and for configuring a UE to receive an UL SA or a DL SA having one of the at least two different sizes.

In accordance with another embodiment of the present invention, a method is provided for designing a compact UL SA or a compact DL SA to address, respectively, only a portion of the total operating bandwidth for the signal transmission by a UE or for the signal transmission by the Node B.

In accordance with another embodiment of the present invention, a method is provided for designing a compact UL SA or a compact DL SA enabling, respectively, packet transmission from a UE or a Node B with data rate that belongs only in a sub-set of the possible data rates in the UL or in the DL of a communication system, the sub-set not including the higher data rates.

In accordance with another embodiment of the present invention, a method is provided for reducing the range or completely eliminating fields that exist in the full UL SA or in the full DL SA from the compact UL SA or the compact DL SA, respectively.

In accordance with another aspect of the present invention, a communication system is provided for performing scheduling assignments by using an operating bandwidth including frequency resource units, the communication system includes a base station for determining a first scheduling assignment for informing a first user equipment of at least frequency resources allocated to a first signal transmission that enables frequency resource allocation over a first set of frequency resource units, determining a second scheduling assignment for informing a second user equipment of at least frequency resources allocated to a second signal transmission that enables frequency resource allocation over a second set of frequency resource units, wherein the second set of frequency resource units is a sub-set of the first set of frequency resource units, and a plurality of user equipments for receiving scheduling assignment for signal transmission from the base station and performing the signal transmission using frequency resources allocated through the scheduling assignment, a plurality of user equipments including the first user equipment and the second user equipment.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF THE EXEMPLARY EMBODIMENTS

Figure 1:
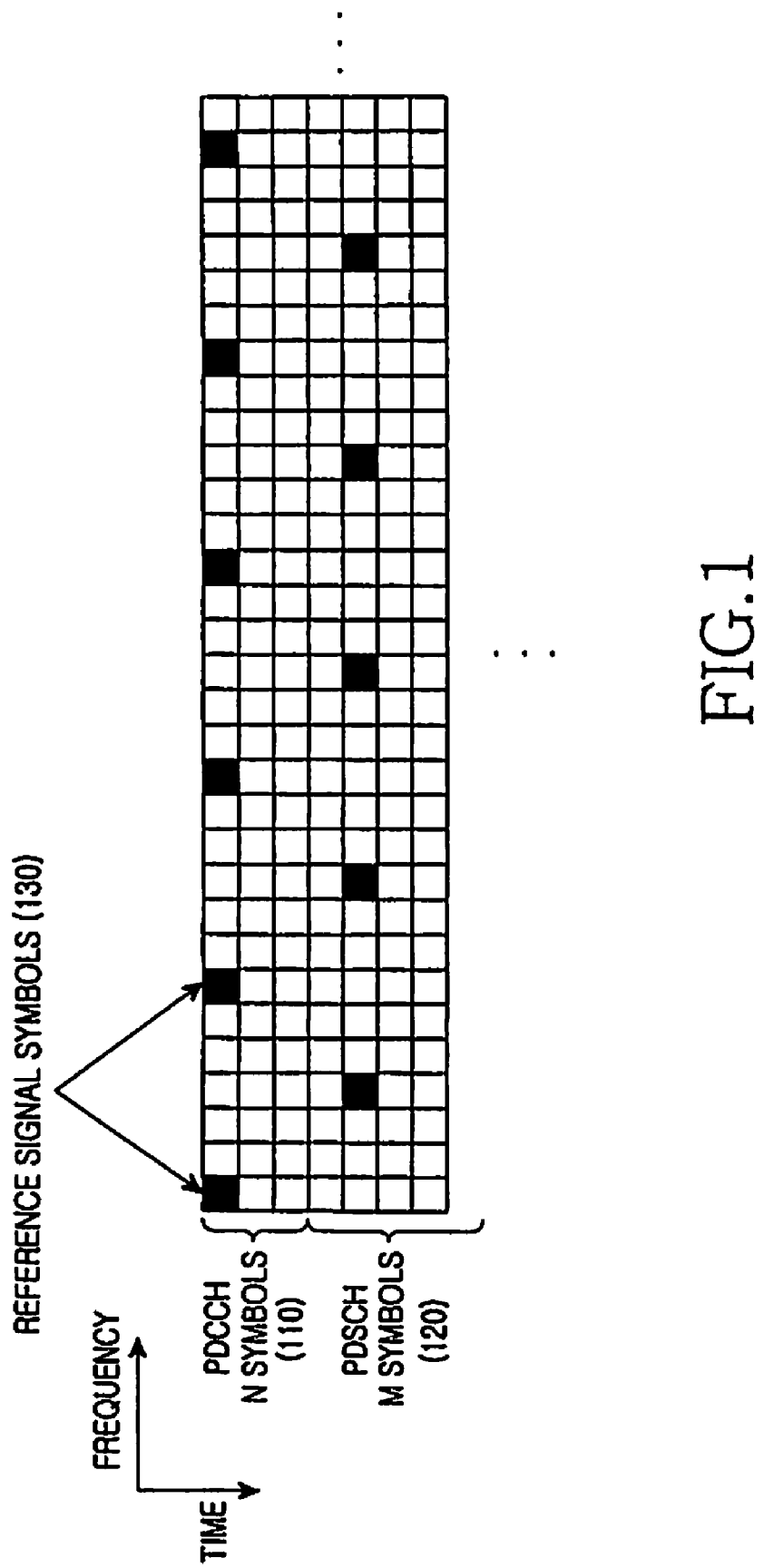
FIG. 1 is a diagram illustrating an exemplary DL sub-frame structure including a PDCCH transmission in a communication system DL.
Figure 2:
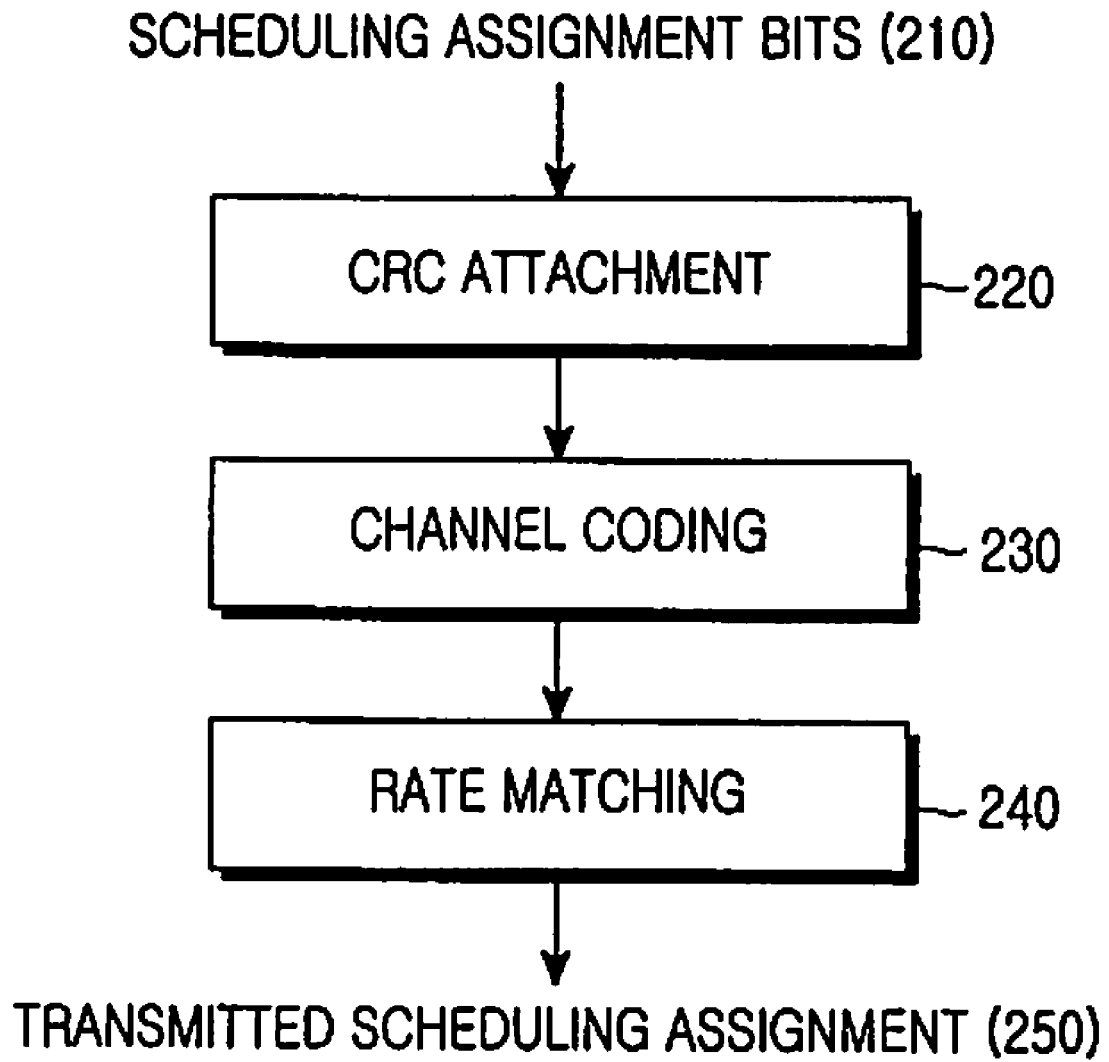
FIG. 2 is a diagram illustrating an exemplary encoding process for a UL scheduling assignment or DL scheduling assignment.

The present invention will now be described more fully hereinafter with reference to the accompanying drawings. The present invention may, however, be embodied in many different forms and should not be construed as being limited to the embodiments set forth herein. Rather, these illustrative embodiments are provided so that this disclosure will be thorough and complete and will fully convey the scope of the invention to those skilled in the art.

Additionally, although the present invention is described with reference to a Single-Carrier Frequency Division Multiple Access (SC-FDMA) communication system, it also applies to all FDM systems in general and to Orthogonal FDMA (OFDMA), OFDM, FDMA, Discrete Fourier Transform (DFT)-spread OFDM, DFT-spread OFDMA, Single-Carrier OFDMA (SC-OFDMA), and SC-OFDM in particular.

The embodiments of the present invention provide solutions for problems related to reducing a total size of scheduling assignments (SAs) conveyed by a serving base station (or Node B) to User Equipments (UEs) through a Physical Downlink Control CHannel (PDCCH) for data packet transmission by the UEs in the UpLink (UL) of a communication system, thereby reducing a total PDCCH size and extending its coverage.

As described above in the Background of the Invention, the PDCCH includes at least UL SAs enabling data packet transmission from UEs to their serving Node B and DownLink (DL) SAs enabling reception by UEs of data packets transmitted by their serving Node B. The UL SAs and DL SAs are separately coded and transmitted. Therefore, reducing the total size of UL SAs enables the use of the sub-carriers that become available for:

a) transmitting additional UL SAs or DL SAs, thereby improving scheduling flexibility for the same PDCCH overhead, or b) using the power of the available sub-carriers to boost the power of other PDCCH fields (such as UL SAs or DL SAs), thereby improving PDCCH coverage for the same PDCCH overhead, or c) reducing the PDCCH overhead by the Node B using at least some of the available sub-carriers for data packet transmission in the Physical Downlink Shared CHannel (PDSCH).

The present invention will now be described with reference to the UL SA, but the same concepts for the construction of compact SAs also apply to the DL SA. The dimensioning of the UL SA size is subsequently considered according to the scheduling BandWidth (BW) for a UE. This scheduling BW may be different among UEs having UL data packet transmission in the same operating BW. Primarily due to the condition for single carrier transmission but also due to the varying size of the Sounding Reference Signal (SRS) transmission BW by UEs, UL SA sizes corresponding to a smaller operating BW can be used for UL scheduling in a larger operating BW by constraining the maximum BW size over which some UEs, such as for example, ones with low Signal-to-Interference and Noise Ratio (SINR), can be scheduled. Therefore, the present invention considers the introduction of a compact UL SA, for scheduling over only a portion of the operating BW, in addition to the full UL SA for scheduling over the entire operating BW.

The compact UL SA size is subsequently analyzed and the corresponding reduction in a total average size of the UL SAs is evaluated. It is assumed that the UL operating BW is divided into scheduling units, referred to as Resource Blocks (RBs), and a data packet transmission from a UE may be performed over one or multiple RBs.

For SC-FDMA signal transmission over a maximum of P RBs, the number of possible contiguous RB allocations to a UE is $1+2+\ldots+P=P(P+1)/2$ and can be signaled with $\lceil \log_2(P(P+1)/2) \rceil$ bits where $\lceil\ \rceil$ denotes the ceiling operation, which rounds a number towards its immediately higher integer.

Table 1 below shows the number of bits required for RB mapping in the UL SA at various system bandwidths and the savings in the number of bits from using the RB mapping for the minimum system bandwidth.

TABLE 1

| System Bandwidth (MHz) | $\log_2(P(P+1)/2)$ | UEs with Low SINR or Small Packets | Savings % |
|---|---|---|---|
| 1.4 | 5 | 5 | 0 |
| 3.0 | 7 | 5 | 29 |
| 5 | 9 | 5 | 44 |
| 10 | 11 | 5 | 55 |
| 15 | 12 | 5 | 58 |
| 20 | 13 | 5 | 62 |

Table 1, more specifically, the second column, shows the number of bits in the UL SA required to specify the assigned RB mapping for a number of possible system BWs where in the exemplary embodiment the operating BW is assumed to be 90% of the system BW and the RB size is assumed to be 180 KHz. Therefore, a system BW of 1.4 MHz corresponds to an operating BW of 1.26 MHz or 7 RBs and a system BW of 10 MHz corresponds to an operating BW of 9 MHz or 50 RBs. Although one or more RBs may be used for transmission of control information in the UL, it is assumed for simplicity that all RBs are available for data transmission. This does not affect the embodiments of the disclosed invention.

Table 1, more specifically, the fourth column, shows the savings as a percentage in the number of bits if the RB allocation is interpreted as only over the RBs corresponding to the 1.4 MHz system BW. For example, such reduced RB allocations can be used for low SINR UEs which in order to achieve the desired target BLock Error Rate (BLER) for their data packet transmission (in the range of 10% or somewhat higher) require that their signal transmission power is not spread over substantially the entire operating BW and is concentrated within a few RBs. Also, at least for low SINR UEs, scheduling over 1.4 MHz or less, for example, is usually preferable relative to scheduling over 10 MHz, for example, because the improved accuracy of the UL CQI estimate (SRS transmission power is concentrated over a smaller BW) leads to improved scheduling accuracy (selection of the UE signal transmission parameters).

Because, for UEs with low SINR, the desired signal reception reliability at the Node B cannot be usually achieved if the signal transmission from a UE is over a wide BW, respective data packet transmissions are scheduled over a relatively small BW. Therefore, using, for the scheduling of such UEs, an UL SA which allows for all possible RB allocations (for example, including the ones over substantially the entire operating BW) and over all Transport Block Sizes (TBS) for the data packet (for example, including ones corresponding to assignments over a large number of RBs number or to signal transmissions with high spectral efficiency) is wasteful. In addition to UEs with low SINR, reducing the range of possible RB allocations may generally apply to other UE classes, such as for example, UEs having transmission of small data packets (small information payloads), which can be accommodated within a few RBs and do not require the entire operating BW to be available for their scheduling.

Table 2 below shows the number of bits required for an exemplary full UL SA and the number of bits required for an exemplary compact UL SA.

TABLE 2

| Information Field | Number of Bits at 10 MHz | Number of Bits at 1.4 MHz | Comment |
|---|---|---|---|
| Resource Allocation | 11 | 5 | Consecutive RBs |
| TBS (MCS) | 8 | 4 | MCS Levels (reduced for 1.4 MHz) |
| HARQ | 2 | 2 | Synchronous HARQ |
| TPC | 2-3 | 2-3 | Power control commands |
| SDMA | 0-3 | 0-3 | SDMA for a maximum of 8 UEs |
| CRC (UE ID) | 16 | 16 | UE ID masked in the CRC |
| TOTAL | 39-43 | 29-33 | About 25% reduction in UL SA size |

Table 2 shows the corresponding savings from using the appropriate dimension for the UL SA fields when considering the overall UL SA size at 10 MHz and 1.4 MHz system BWs. In particular, the savings in the number of bits in the UL SA are primarily obtained from:
  a) the number of bits required to indicate the Resource Block (RB) allocation as only a sub-set of the total operating BW needs to be addressed,
  b) the number of bits required to indicate the TBS, or the Modulation and Coding Scheme (MCS), used by a UE for the data packet transmission as only TBS smaller than the maximum one are supported (the maximum TBS corresponds to RB allocation over the total operating BW and to transmission with the highest spectral efficiency as specified by the MCS corresponding to the highest modulation order, such as 64QAM, and the highest coding rate, such as 0.9, which, equivalently to the support of the maximum TBS, need not be supported in the compact UL SA).

The above two fields in the UL SA are the largest ones and the number of corresponding bits in the compact UL SA is substantially reduced by about 50% by considering scheduling over 1.4 MHz instead of 10 MHz. The percentage reduction in the UL SA size is smaller, mainly due to the irreducible number of CRC bits, which in an exemplary embodiment are assumed to be masked by the UE identity.

The remaining fields in Table 2, correspond to parameters associated with Hybrid Automatic Repeat reQuest (HARQ), Transmit Power Control (TPC) for the UL data packet transmission, and with identifying a UE at its serving Node B in case of Spatial Domain Multiple Access (SDMA) multiplexing of the UL data packet transmissions among UEs. These fields are only exemplary and not exclusive of additional fields that may exist either in the compact UL SA or in the full UL SA. In the compact UL SA, similar to the fields for the RB allocation and the MCS (or TBS) assignment, the range of the remaining fields may be reduced or some of these fields may even be completely eliminated (by not supporting certain features in the compact UL SA that are otherwise supported in the full UL SA). For example, SDMA may not be supported in the compact UL SA and the respective bits that exist in the full UL SA may not exist in the compact UL SA.

From Table 1 and Table 2, it can be observed that while the size of the full UL SA depends on the operating BW, the size of the compact UL SA can be independent of the operating BW, as the compact UL SA may always address the same number of RBs regardless of the operating BW.

Figure 3:
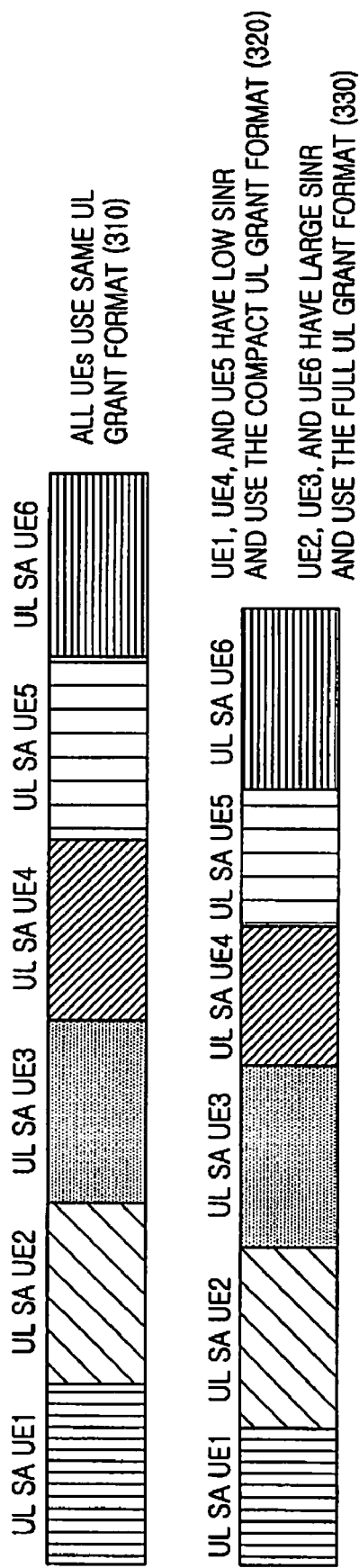
FIG. 3 is a block diagram illustrating a combination of compact UL scheduling assignments and full UL scheduling assignments in a PDCCH.

FIG. 3 illustrates a principle of using a compact UL SA and its comparison to the prior art case of having the same, full, UL SA for all UEs 310. Low SINR UEs or UEs with transmission of small data packets, for example, use a compact UL SA 320, while the remaining UEs use the full UL SA 330.

As only a portion of UEs experience low long term SINRs (such as for example, UEs located near the edge of a cell), the reduction in the UL SA size may be applicable to at least such UEs. However, these UEs require lower coding rate for their UL SA in order to achieve the same BLER as UEs with higher SINR, and the reduction in the raw number of bits (before coding) for the UL SA is further magnified after the encoding operation.

The average savings in the total size of UL SAs are subsequently evaluated assuming that the compact UL SA size is used only for low SINR UEs, while for the remaining UEs, the full UL SA size is used. The UEs for which the compact UL SA is assumed to apply may be a lower bound to the ones in practice as UEs with transmission of small data packets or operation in a fully loaded system, where the RB allocation per UE may be limited, are not accounted. Therefore, the corresponding gains in the average total size of UL SAs may be respectively considered as a lower bound to ones that could be achieved in practice.

Figure 4:
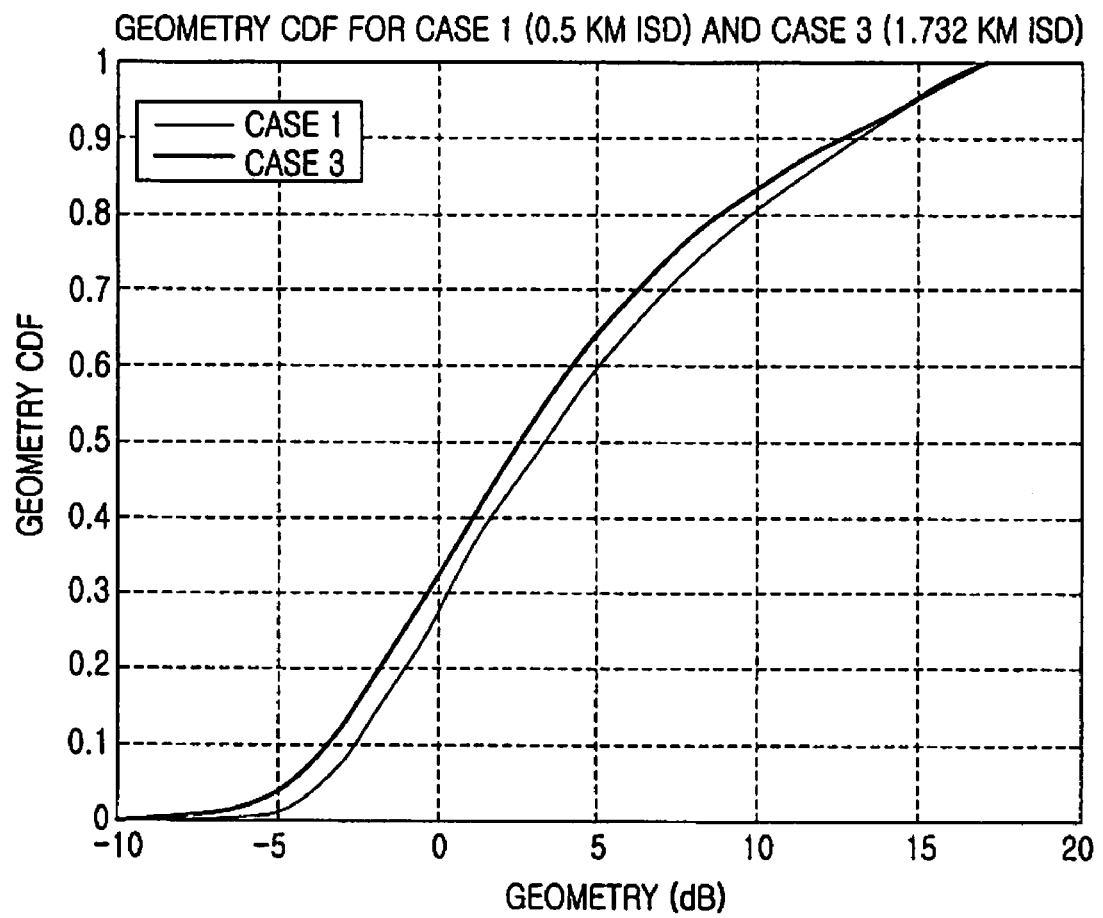
FIG. 4 is a graph illustrating a geometry (SINR) Cumulative Distribution Function (CDF) for two exemplary layouts in a cellular communication system DL.

FIG. 4 illustrates the UE geometry (which is the same parameter as the UE SINR) Cumulative Density Function (CDF) for two typical operation setups, referred to as Case 1 and Case 3, of cellular communication systems. Case 1 corresponds to Inter-Site Distance (ISD) of 0.5 Kilometers while Case 3 corresponds to ISD of 1.732 Kilometers. Assuming two Node B transmitter antennas and two UE receiver antennas, i.e., a 2×2 antenna setup, and a highly frequency selective channel, the required code rate for the UL SA to achieve BLER of 0.01 is typically 1/12, 1/6, and 1/3 for SINRs below of −3 dB, between −3 dB and 0 dB, and between 0 dB and 6 dB, respectively. A code rate of 2/3 can be used otherwise. For one Node B transmitter antenna and channels with low frequency selectivity about 1.5-2.0 dB needs to be added to the above numbers.

For Case 1, the percentage of UEs with SINR below −3 dB, between −3 dB and 0 dB, and between 0 dB and 6 dB is respectively 9%, 21%, and 32%. Assuming exclusively the use of full UL SA and normalizing by the corresponding information bits, the total average size of the UL SAs is:

$$(9 \times 12)+(21 \times 6)+(32 \times 3)+(38 \times 3/2)=387.$$

Assuming that the compact UL SA is used for UEs with SINR below 0 dB (this compact UL SA has the same configuration as the UL SA for the 1.4 MHz system BW), then, from Table 2, accounting for the 25% reduction in UL SA size for UEs with low SINRs (two lowest coding rates for SINR below 0 dB), the total average size for the UL SAs is:

$$(9 \times 12 \times 0.75)+(21 \times 6 \times 0.75)+32 \times 3+38 \times 3/2=328.$$

Therefore, the savings are 15.2% of the total average UL SA size.

For Case 3, the percentage of UEs with SINR below −3 dB, between −3 dB and 0 dB, and between 0 dB and 6 dB is respectively 13%, 20%, and 33%. Repeating the same evaluation as above, the savings from using a compact UL SA are 16.2% of the total average size for the UL SAs.

For the 1×2 setup or for channels with low frequency selectivity, the same evaluation as before can be repeated by adding 1.5-2.0 dB to the previous SINR ranges where the coding rates of 1/12, 1/6, 1/3 and 2/3 are applicable. Then, after adding 1.5 dB, the percentage of UEs with SINR below −1.5 dB, between −1.5 dB and 1.5 dB, and between 1.5 dB and 7.5 dB is respectively 18%, 19%, and 35% for Case 1 and 23%, 21%, and 32% for Case 3. Performing the same evaluation as above using the full UL SA size for all UEs and the compact UL SA size for UEs with SINR below 1.5 dB, the savings in the total average size of UL SAs for Case 1 and Case 3 are 17.3% and 18.8%, respectively.

In practice, some additional dB protection may be applied in the selection of the UL SA coding rates in order to guard against SINR estimation errors. This leads to using lower coding rates for a higher percentage of UEs than assumed in the above evaluation. For example, for the 2×2 antenna setup, a coding rate of 1/12 may be used for SINR up to −1 dB, instead of up to −3 dB. This would result into higher savings in the total UL SA size than derived from the above evaluation.

Therefore, by using a compact UL SA size for UEs with low SINR, the total average size of the UL SAs is reduced by at least 15%-20%. This reduction increases for the larger system BWs (for example, it approaches 25% at 20 MHz). The instantaneous, per transmission sub-frame, gains can be much larger than the average ones and restrictions in scheduling several UEs with low SINR in the same sub-frame, due to the limit in the total PDCCH size (such as, for example, having a total PDCCH size no larger than three OFDM symbols), are substantially alleviated due to the compact UL SA.

As previously mentioned, a reduction in a total average size of UL SAs can translate to better throughput, better coverage, or improved BLER for DL SA or UL SA. The total PDCCH size may often be reduced, for example from three to two OFDM symbols in FIG. 1, resulting to a throughput gain of 9% (assuming 14 OFDM symbols per sub-frame in an exemplary embodiment). Alternatively, the reduction can translate to more available sub-carriers for power boosting of the various PDCCH fields. For example, if at 10 MHz operating BW the full UL SAs occupy one OFDM symbol then, for sub-carrier spacing of 15 KHz, a reduction by 15%-20% in the total size of UL SAs corresponds to about 100 sub-carriers whose power can be then used to boost by 3 dB the power of the RS transmitted over 100 sub-carriers in the first OFDM symbol. Coverage can also improve as the compact UL SA can be used for coverage limited UEs and the required power to reach such UEs is more easily available when fewer sub-carriers need to be transmitted.

As the UL SAs can have at least two possible sizes for an operating BW, for example, a compact one and a full one, and as separate transmission is assumed for each UL SA, a UE may have to decode both the UL SA with the compact size and the UL SA with the full size in order to identify the one possibly assigned to it. To reduce this decoding complexity, a UE can be configured through higher layer signaling to receive one of the at least two UL SA formats. As this configuration typically depends on very slowly changing factors relative to the sub-frame duration, such as the SINR operating conditions each UE experiences, or on the data rate of the communication service, or potentially on the total UL traffic load, a UE should be infrequently configured, through higher layers, to receive one of the at least two UL SA formats.

A UE may interpret the BW of the UL SA relative to the BW of the last SRS transmission. Alternatively, one more bit may be included in the compact UL SA to indicate whether the assigned RBs correspond to the last SRS transmission BW or the BW of the last SA. Alternatively, a UE may be configured by the serving Node B, through dedicated higher layer signaling, such as for example through the Medium Access Control (MAC) layer, to transmit its signal only at a specific part of the total operating BW (for example, only in a maximum of the first 6 RBs of an operating BW consisting of 50 RBs). In the present invention, higher layer signaling refers to any signaling that is not through the physical layer of the communication system.

While the present invention has been shown and described with reference to certain exemplary embodiments thereof, it will be understood by those skilled in the art that various changes in form and details may be made therein without departing from the spirit and scope of the present invention as defined by the appended claims.

What is claimed is:

1. A method for performing scheduling assignments at a base station of a communication system having an operating bandwidth including frequency resource units, the method comprising the steps of:
   determining a first scheduling assignment for informing a first user equipment of at least frequency resources allocated to a first signal transmission that enables frequency resource allocation over a first set of frequency resource units;
   determining a second scheduling assignment for informing a second user equipment of at least frequency resources allocated to a second signal transmission that enables frequency resource allocation over a second set of frequency resource units, wherein the second set of frequency resource units is a sub-set of the first set of frequency resource units; and
   transmitting the first scheduling assignment and the second scheduling assignment from the base station,
   wherein a size of the first set of frequency resource units is determined according to the operating bandwidth, and a size of the second set of frequency resource units is determined independently of the operating bandwidth.

2. The method as in claim 1, wherein the first signal transmission and the second signal transmission are performed by the first user equipment and the second user equipment, respectively.

3. The method as in claim 1, wherein the first signal transmission and the second signal transmission are performed by the base station.

4. The method as in claim 1, wherein the second set of frequency resource units has a same size for at least two different values of the operating bandwidth.

5. The method as in claim 1, wherein the first user equipment is configured for the first scheduling assignment type through higher layer signaling from the base station.

6. The method as in claim 1, wherein the second user equipment is configured for the second scheduling assignment type through higher layer signaling from the base station.

7. A method for performing scheduling assignments at a base station of a communication system having an operating bandwidth including frequency resource units, the method comprising the steps of:
   determining a first scheduling assignment for informing a first user equipment of at least a Modulation and Coding Scheme (MCS) allocated to a first signal transmission that enables signal transmission with an MCS from a first set of MCSs;
   determining a second scheduling assignment for informing a second user equipment of at least an MCS allocated to a second signal transmission that enables signal transmission with an MCS from a second set of MCSs, wherein the second set of MCSs is a sub-set of the first set of MCSs; and
   transmitting the first scheduling assignment and the second scheduling assignment from the base station;
   wherein an operating bandwidth for the second user equipment is smaller than an operating bandwidth for the first user equipment, and the second user equipment has a low Signal-to-Interference and Noise Ratio (SINR),
   wherein a size of the first set of MCSs is determined according to the operating bandwidth, and a size of the second set of MCSs is determined independently of the operating bandwidth.

8. The method as in claim 7, wherein the first signal transmission and the second signal transmission are performed by the first user equipment and the second user equipment, respectively.

9. The method as in claim 7, wherein the first signal transmission and the second signal transmission are performed by the base station.

10. The method as in claim 7, wherein the second set of MCSs has a same size for at least two different values of the operating bandwidth.

11. The method as in claim 7, wherein the first user equipment is configured for the first scheduling assignment type through higher layer signaling from the base station.

12. The method as in claim 7, wherein the second user equipment is configured for the second scheduling assignment type through higher layer signaling from the base station.

13. A method for performing scheduling assignments at a base station of a communication system having an operating bandwidth including frequency resource units, the method comprising the steps of:
   determining a first scheduling assignment for informing a first user equipment of at least a Transport Block Size (TBS) allocated to a first signal transmission that enables signal transmission with a TBS from a first set of TBSs;
   determining a second scheduling assignment for informing a second user equipment of at least a TBS allocated to a second signal transmission that enables signal transmission with a TBS from a second set of TBSs, wherein the second set of TBSs is a sub-set of the first set of TBSs; and transmitting the first scheduling assignment and the second scheduling assignment from the base station, wherein a size of the first set of TBSs is determined according to the operating bandwidth, and a size of the second set of TBSs is determined independently of the operating bandwidth.

14. The method as in claim 13, wherein the first signal transmission and the second signal transmission are performed by the first user equipment and the second user equipment, respectively.

15. The method as in claim 13, wherein the first signal transmission and the second signal transmission are performed by the base station.

16. The method as in claim 13, wherein the second set of TBSs has a same size for at least two different values of the operating bandwidth.

17. The method as in claim 13, wherein the first user equipment is configured for the first scheduling assignment type through higher layer signaling from the base station.

18. The method as in claim 13, wherein the second user equipment is configured for the second scheduling assignment type through higher layer signaling from the base station.

19. A communication system for performing scheduling assignments by using an operating bandwidth including frequency resource units, the communication system comprising:

a base station for determining a first scheduling assignment for informing a first user equipment of at least frequency resources allocated to a first signal transmission that enables frequency resource allocation over a first set of frequency resource units, determining a second scheduling assignment for informing a second user equipment of at least frequency resources allocated to a second signal transmission that enables frequency resource allocation over a second set of frequency resource units, wherein the second set of frequency resource units is a sub-set of the first set of frequency resource units, and transmitting the first scheduling assignment and the second scheduling assignment; and a plurality of user equipments for receiving scheduling assignment for signal transmission from the base station and performing the signal transmission using frequency resources allocated through the scheduling assignment, a plurality of user equipments including the first user equipment and the second user equipment, wherein a size of the first set of frequency resource units is determined according to the operating bandwidth, and a size of the second set of frequency resource units is determined independently of the operating bandwidth.

* * * * *